J. E. HARRISON.
VEHICLE TIRE.
APPLICATION FILED MAY 5, 1909.
968,941.
Patented Aug. 30, 1910.
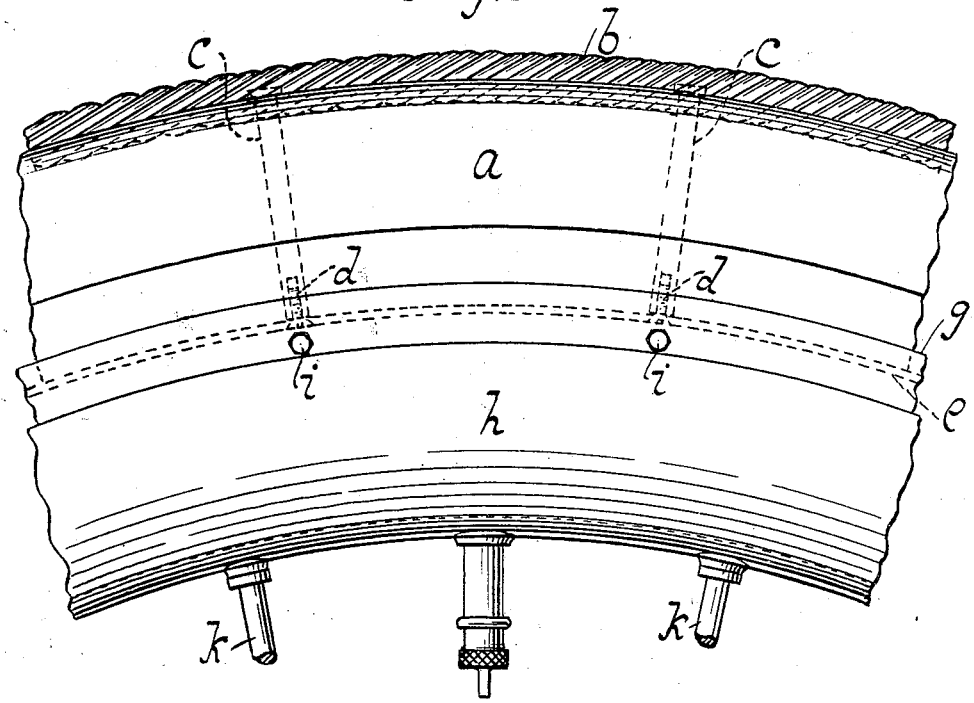
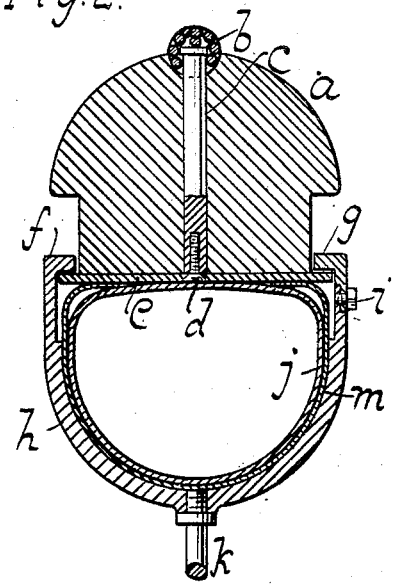
WITNESSES:
William Miller
Christian Almstaedt
INVENTOR
James E. Harrison
BY
Hauff - Warland
ATTORNEYS

UNITED STATES PATENT OFFICE.

JAMES E. HARRISON, OF NEW YORK, N. Y.

VEHICLE-TIRE.

968,941.

Specification of Letters Patent.   Patented Aug. 30, 1910.

Application filed May 5, 1909. Serial No. 494,130.

*To all whom it may concern:*

Be it known that I, JAMES E. HARRISON, a citizen of the United States, residing at New York, in the county of New York and State of New York, have invented new and useful Improvements in Vehicle-Tires, of which the following is a specification.

This invention relates to a tire for vehicles, automobiles, and the like and it consists in the novel features of construction set forth in the following specification and claim and illustrated in the accompanying drawing in which:—

Figure 1 represents a side elevation of a tire embodying this invention. Fig. 2 is a transverse vertical section of the same.

This tire consists of a solid elastic tread which cannot be punctured combined with a pneumatic rubber tube to insure resiliency. The tread is provided with a wire cable so that the tire will not skid or slip. The casing in which the pneumatic tube is housed, and the tread are slidably connected together.

In this drawing the letter $a$ designates the tread of the tire which is composed of rubber molded to annular form. In this rubber tread is partly embedded an annular wire cable $b$ which projects slightly beyond the periphery of the tread to contact with the ground and prevent the tire from skidding or slipping. A series of bolts $c$ are fastened or anchored to the cable each bolt being attached by means of a screw $d$ to a band $e$ located on the inner portion of the tread. This construction prevents the cable from being displaced and at the same time secures the band $e$ to the tread. This band is annular and projects at its opposite side edges beyond the corresponding sides of the tread, these projecting portions being engaged by the lateral annular flange $f$ and the laterally flanged annular piece $g$. The flanged piece $g$ is attached to the casing $h$ by a series of screws or bolts $i$. A rubber tube $j$ is housed in the casing or envelop $h$ which partly encircles the tube while the other portion of the latter is covered by the band on the tread. The flanged piece $g$ can be removed from the tire by unscrewing the bolts $i$, the tread can then be lifted away to readily give access to the pneumatic tube $j$. The annular band $e$ is constructed of springy metal so that it can bend circumferentially when the tread is jarred or jolted.

The casing is provided with bolts $k$ whereby the tire can be attached to the rim of a wheel not shown. The interior of the casing is padded with fabric $m$ to avoid chafing of the pneumatic tube. When the cable becomes worn it can be removed from the tread simply by unscrewing the fastenings $d$. The band $e$ in conjunction with the casing and its flanges prevents lateral as well as circumferential dislodgment of the tread.

When the tire is in use the pneumatic rubber tube is inflated thus expanding the parts until the flanges engage the band then when pressure is exerted on the tread it partly compresses the pneumatic tube and the tread will slide.

I claim:—

A tire comprising a solid rubber tread; a continuous cable partly embedded in the outer surface thereof; a continuous metal band arranged on the inner surface of the tread; a series of bolts extending through said tread, and having their outer ends anchored in the cable; and a series of screws having their heads engaging the band and their stems inserted in tap holes in the inner ends of said bolts.

In testimony whereof I have hereunto set my hand in the presence of two subscribing witnesses.

JAMES E. HARRISON.

Witnesses:
W. C. HAUFF,
CHRISTIAN OLMSTAEDT.